(12) United States Patent  (10) Patent No.: US 8,446,728 B1
McDonald  (45) Date of Patent: May 21, 2013

(54) FLASH MEMORY CARD CARRIER

(76) Inventor: Wade S. McDonald, Discovery Bay, CA (US)

( * ) Notice: Subject to any disclaimer, the term of this patent is extended or adjusted under 35 U.S.C. 154(b) by 253 days.

(21) Appl. No.: 13/041,560

(22) Filed: Mar. 7, 2011

Related U.S. Application Data

(60) Provisional application No. 61/460,430, filed on Jan. 3, 2011.

(51) Int. Cl.
*H05K 1/14* (2006.01)

(52) U.S. Cl.
USPC .......................................... 361/737; 439/946

(58) Field of Classification Search
USPC .................................. 439/945, 946
See application file for complete search history.

(56) References Cited

U.S. PATENT DOCUMENTS

| | | | | |
|---|---|---|---|---|
| 5,581,065 A * | 12/1996 | Nishikawa et al. | ........... | 235/492 |
| 5,936,227 A * | 8/1999 | Truggelmann et al. | ....... | 235/492 |
| 6,069,795 A * | 5/2000 | Klatt et al. | ..................... | 361/737 |
| 6,179,210 B1 * | 1/2001 | Haas et al. | ..................... | 235/488 |
| 6,250,965 B1 * | 6/2001 | Neifer | ........................... | 439/630 |
| 6,320,751 B2 * | 11/2001 | Takeda et al. | ................. | 361/737 |
| 6,333,854 B1 * | 12/2001 | Sasaoka et al. | ............... | 361/737 |
| 6,381,143 B1 * | 4/2002 | Nakamura | ..................... | 361/737 |
| 6,554,193 B1 * | 4/2003 | Fehrman et al. | ................. | 235/488 |
| 6,561,432 B1 * | 5/2003 | Vedder et al. | ................. | 235/492 |
| 6,567,291 B2 * | 5/2003 | Iwasaki et al. | .................. | 365/63 |
| 6,766,952 B2 * | 7/2004 | Luu | .............................. | 235/451 |
| 7,218,528 B2 * | 5/2007 | Chen | ............................ | 361/737 |
| 7,836,237 B2 * | 11/2010 | Lien et al. | ..................... | 710/301 |
| 7,837,122 B2 * | 11/2010 | Martinent et al. | ............ | 235/492 |
| 7,871,007 B2 * | 1/2011 | Amiot et al. | .................. | 235/486 |
| 8,102,658 B2 * | 1/2012 | Hiew et al. | .................... | 361/737 |
| 8,107,246 B2 * | 1/2012 | Fidalgo et al. | .................. | 361/737 |
| 2002/0007554 A1 * | 1/2002 | Takeda et al. | .................. | 29/837 |
| 2002/0160630 A1 * | 10/2002 | Kashima | ........................ | 439/55 |
| 2009/0134502 A1 * | 5/2009 | Takiar et al. | ................. | 257/666 |

* cited by examiner

*Primary Examiner* — Lisa Lea Edmonds
*Assistant Examiner* — Xanthia C Cunningham
(74) *Attorney, Agent, or Firm* — Charles L. Thoeming

(57) ABSTRACT

A multi-standard flash-memory-card carrier includes a carrier chassis and bay to accept flash-memory cards. Embodiments provide flexible hinges or covers allowing use of the card within the chassis or release there from, and adaptable chassis to include additional flash-memory storage within the chassis and data transfer through connected wires within the flexible hinge. All micro and standard flash-memory cards can be carried in the disclosed flash-memory-card carrier, and all embodiments of the carrier can be sized for easy placement in plastic sleeves for credit cards in a person's wallet.

16 Claims, 3 Drawing Sheets

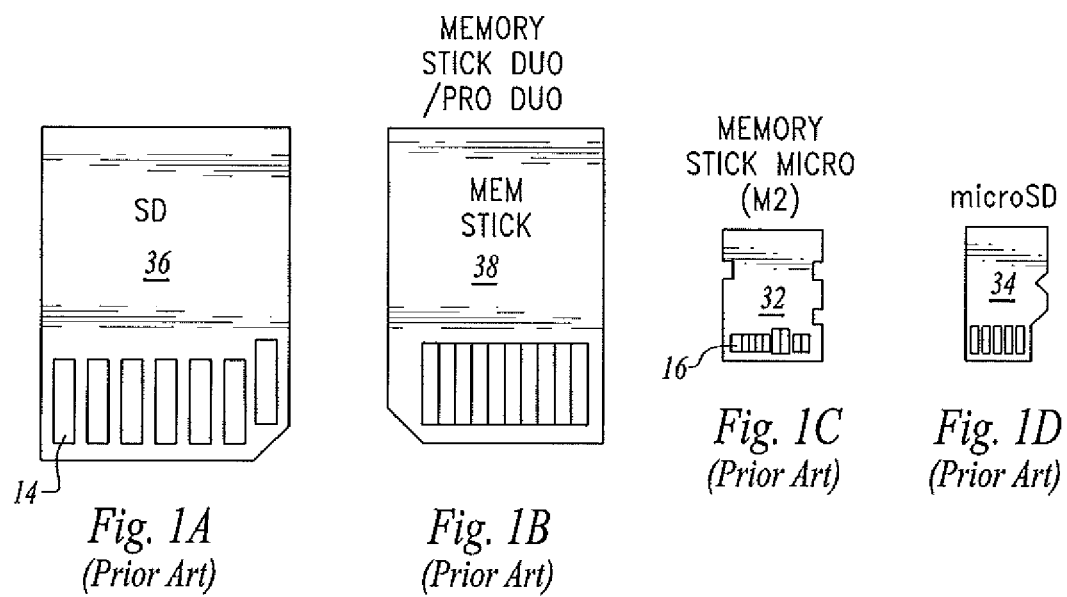
Fig. 1A (Prior Art)
Fig. 1B (Prior Art)
Fig. 1C (Prior Art)
Fig. 1D (Prior Art)
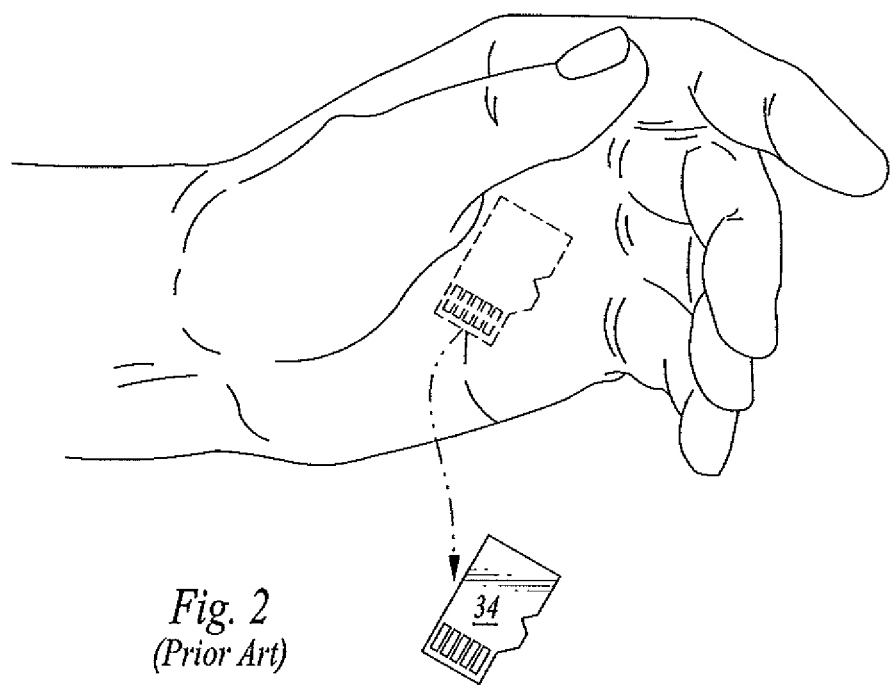
Fig. 2 (Prior Art)

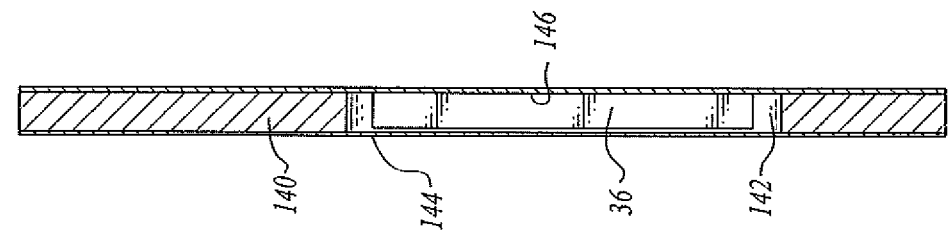
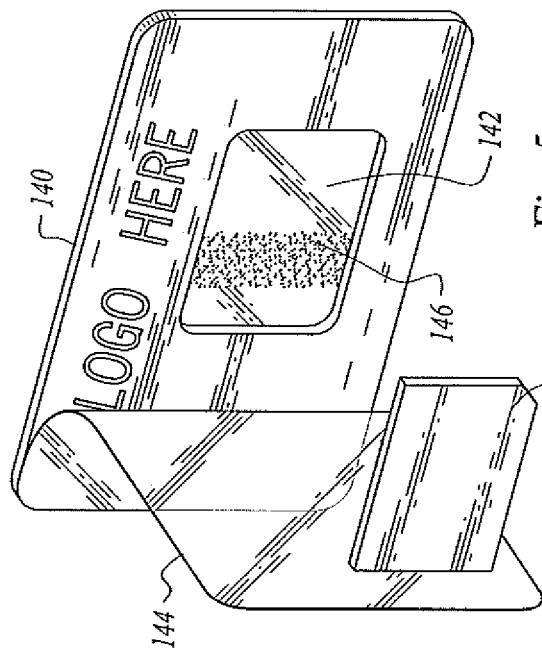
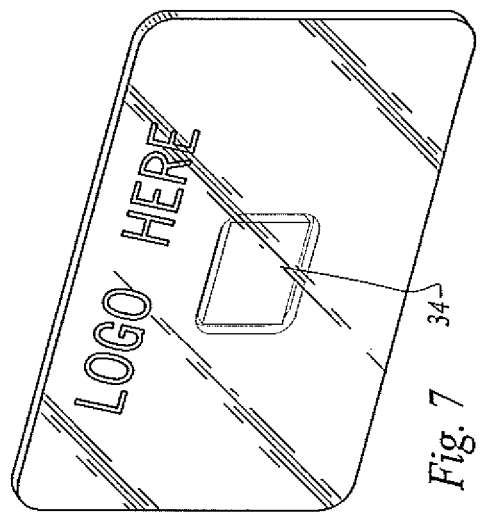
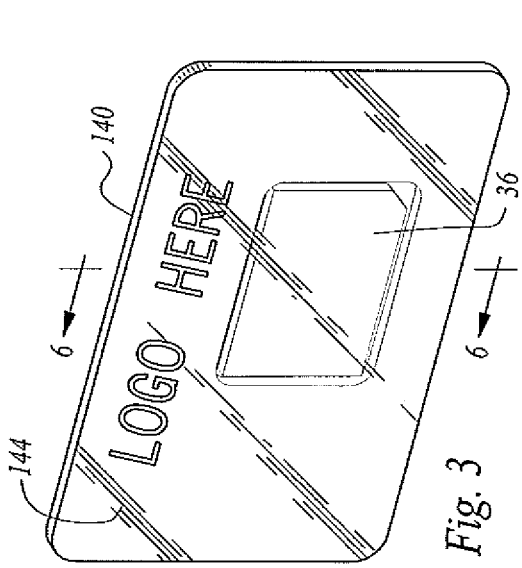
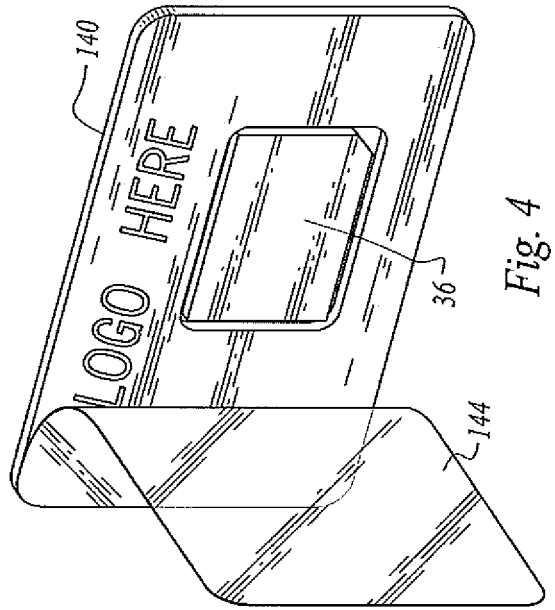

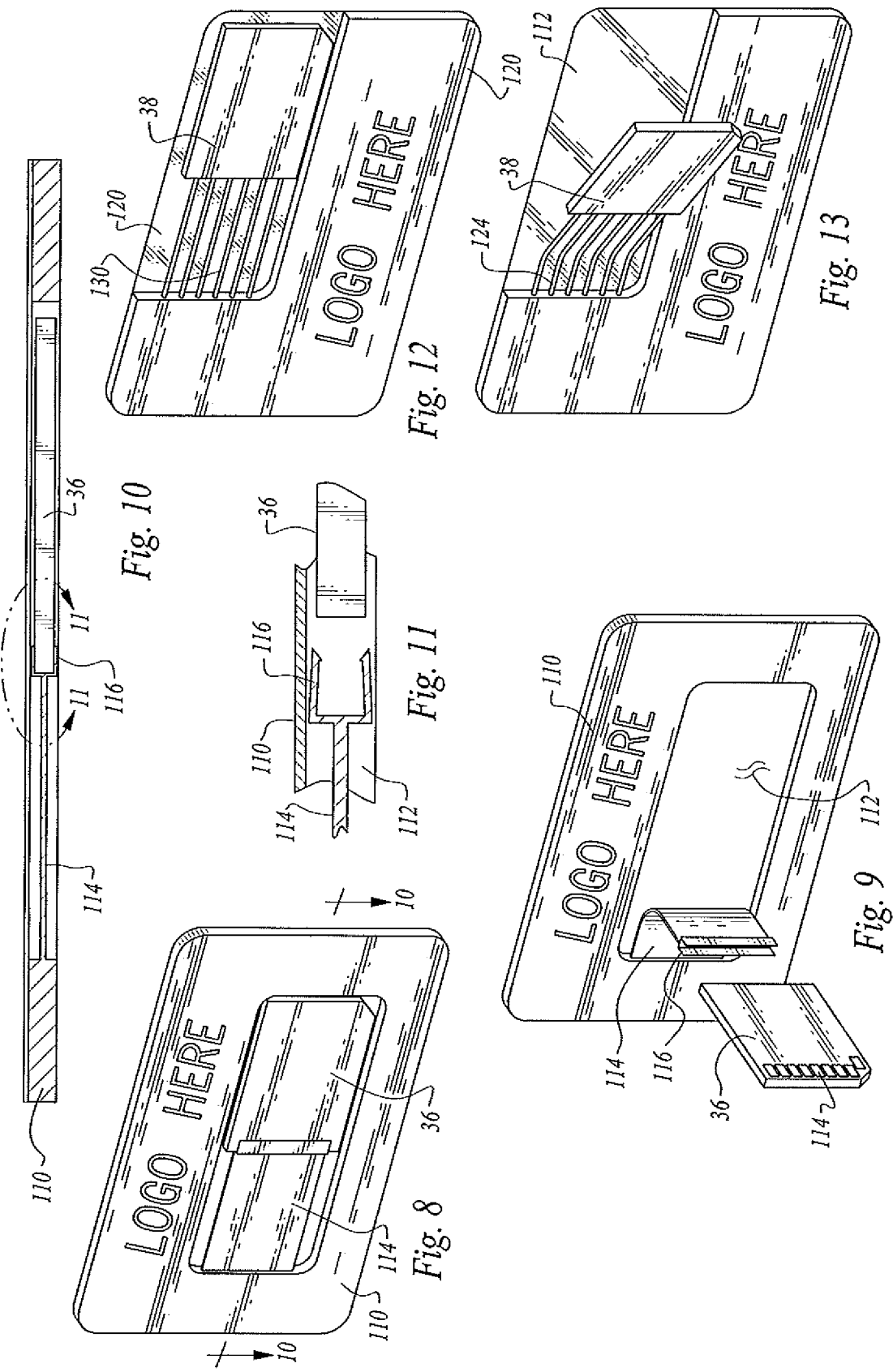

FLASH MEMORY CARD CARRIER

CROSS-REFERENCES TO RELATED APPLICATIONS

This United States non-provisional patent application is based upon and claims the filing date of U. S. provisional patent application Ser. No. 61/460,430 filed Jan. 3, 2011.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to electronics carriers, and more particularly to wallet-sized carriers for carrying small flash-memory cards.

BACKGROUND OF THE INVENTION

Small flash-memory cards have become increasingly prevalent and have replaced floppy disks for data transport. Reduced prices and advances in technology for flash-memory chips have produced larger memory capacities in multiple, diverse form factors, and advances in chip packaging have allowed for smaller physical sizes of flash-memory cards.

A flash-memory chip may be soldered to a printed-circuit board (PCB) or a flex carrier substrate that is then encased in a plastic shell that exposes metal contacts. The metal contacts engage a connector plug when the flash-memory card is plugged into a host, such as a personal computer (PC), cell phone, digital camera, or other microprocessor based computing device. A flash controller may be integrated with the flash-memory chip, or may be a separate chip soldered to the PCB or flex carrier. For writes, the flash controller receives commands, address, and data carried from the host over a host bus to the metal contacts, and sends corresponding control, address, and data signals to the flash-memory chip.

A number of protocols are used for the host bus, and standards have been developed that specify the physical dimensions of the flash-memory card as well as the host-bus protocol.

Legacy standards such as compact-flash (CF) specified large, thick devices. More recent standards such as Sony's Memory Stick or Secure Digital (SD) demonstrably reduced the flash-memory card thickness.

Additional improvements in packaging and flash-memory card construction have yielded even smaller flash-memory cards. An extension of SD known as microSD yields a flash-memory card nearly the size and thickness of a US dime coin, although the microSD card is rectangular and lighter than a dime. An extension of Sony's Memory Stick, known as a Memory Stick Micro (M2) is similar in size and thickness.

FIG. 1 shows several prior-art flash-memory cards. SD card 36 is a Secure Digital (SD) card that has a series of metal contacts 14 exposed along one edge. Metal contacts 14 mate with socket contacts in a host when SD card 36 is inserted into a host. Metal contacts 14 include power, ground, and other signals such as data lines, a clock, command, and card-detect signals.

Memory Stick 38 is a Memory Stick Duo or PRO Duo flash-memory card. SD card 36 and Memory Stick 38 are mid-generation devices and are larger in size, being roughly an inch in length and about 2 mm in thickness.

Newer-generation devices include Memory Stick Micro 32 (M2) and microSD card 34. These devices are about a quarter of the size of earlier-generation cards, such as SD card 36 and Memory Stick 38. MicroSD card 34 has a reduced thickness of only 1 mm, while Memory Stick Micro 32 is 1.2 mm in thickness. Metal contacts 16 are smaller, and may have longer contacts for power and ground to connect power and ground before other signals are connected during insertion.

FIG. 2 highlights a problem with the smaller flash-memory cards. The extremely small size of microSD card 34 (the size of a fingernail) makes accidental loss of the card more likely than for the larger cards. MicroSD card 34 could slip out of a person's hand, or pass through a small hole in a person's pocket without notice. Memory Stick Micro 32 or microSD card 34 could easily be lost on a messy desk at work or at home.

Loss of a flash-memory card is quite undesirable, not just due to the cost of the flash device itself. The data stored on the flash-memory card may be critical data. Loss of such critical data may lead to identity theft or compromised trade secrets. Address and phone lists of customers could be useful to a competitor. A spammer may use a list of email addresses found on a lost flash-memory card, to the embarrassment of the owner of the lost flash-memory card.

MicroSD card 34 could be inserted into an adapter for a larger format, such as an adapter between microSD card 34 and SD card 36. The size of SD card 36, however, is still somewhat small. Credit-card-sized carriers are available for carrying a car key in a person's wallet for emergencies, and a similar carrier could be used for carrying SD card 36 in a wallet.

What is desired is a credit-card-sized flash-memory card carrier that fits in a person's wallet. A credit-card-sized flash-memory card carrier that can e adapted to carry multiple kinds of flash-memory cards is desirable. A flash-memory card carrier that has a size similar to a credit card is desirable so that the carrier could be placed into a person's wallet in place of a credit card. A credit-card-sized carrier is desirable for transporting micro flash-memory cards so that the micro flash-memory cards are not damaged, lost, or erased during transport.

The flash-memory card carrier has been developed in response to the present state of the art, and in particular, in response to the problems and needs in the art that have not yet been fully solved by currently available flash-memory card carriers. Accordingly, the flash-memory card carrier has been developed to provide an improved flash-memory card carrier chassis with elements configured to minimize damaged loss, or erasure of at least one stored flash-memory card while maintaining carrier structural rigidity. The flash-memory card carrier also decreases manufacturing costs by using a flexible hinge element affixed to the carrier and releasably attached to an end of a flash-memory card to provide use of the flash-memory card while attached to the carrier. Alternatively, the flash-memory can be detached from the hinge element to allow the flash-memory card to reside within certain devices until the data transferred to the flash-memory card is transferred to other devices to prevent damage to the flash-memory card and loss of the data, thus overcoming many or all of the above-discussed shortcomings in the art.

The flash-memory card carrier solves many or all of the above-described problems by providing an improved enclosed carrier for flash-memory card transfer and storage.

An enclosure chassis stores at least one flash-memory card, and includes at least one mounting surface having a flexible hinge element affixed to the carrier mounting surface and releasably attached to an end of a flash-memory card to provide use of the flash-memory card while attached to the carrier.

The flexible hinge element affixed to the carrier mounting surface damped enclosure chassis according to the flash-memory card carrier overcomes problems caused by having to manually handle flash-memory cards outside or detached from the carrier and lost, damaged or erased flash-memory cards caused by such limitations in the art.

A further objective of the flash-memory card carrier is to provide a lightweight and durable flash-memory card carrier capable of preventing flash data card loss, damage or unintentional erasure from point of data loading from a first separate device to the flash-memory card to point of transfer of the data from the flash-memory card to a second separate device.

Yet another principal objective of the flash-memory card carrier is to provide an efficient and inexpensive design, from the stand point of both the cost of the materials and the quantity of materials used in manufacture of the flash-memory card carrier. The flash-memory card carrier is also easy to manufacture. Additionally, the flash-memory card carrier is readily assembled such that data degradation or erasures are minimized during set-up and use of the flash-memory card carrier.

Another objective of the flash-memory card carrier is to provide a convenient and stable system and assembly to provide uniform data protection and stability for the data contained in at least one flash-memory card from a point of data entry into the at least one flash-memory card to a point of data transfer from the at least one flash-memory card.

DISCLOSURE OF INVENTION A flash-memory card carrier includes a chassis having a uniformly deep chassis bay portion. At least one flexible hinge element having one end affixed to the chassis at one end of the chassis bay portion is provided. A clip assembly on a second end of the at least one flexible hinge element is sized to receive and releasably hold a non-contact end of a flash-memory card. The at least one flexible hinge element, clip assembly and releasably attached flash-memory card are sized to be received and reside within the chassis bay portion for transport or storage to prevent inadvertent loss of the flash-memory card. The flash-memory card may be deployed from the chassis bay portion on the at least one flexible hinge element to be detached for use or used while connected to the carrier. The at least one flexible hinge element is operable and deformable to allow the second end of the at least one flexible hinge element and corresponding clip assembly and attached flash-memory card to reach a position orthogonal to the planar rectangular chassis side surface. An embodiment of flash-memory card carrier of includes a rectangular, uniformly deep chassis bay portion centered on a planar rectangular chassis side surface providing a storage of the at least one flexible hinge element, the clip assembly and the releasably attached flash-memory card within the bay portion below the planar rectangular chassis side surface. The uniformly deep chassis bay portion housing the flexible hinge element, the clip assembly and the releasably attached flash-memory card may have a backing or be open to both sides of the chassis.

An embodiment of flash-memory card carrier provides an assembly wherein the chassis, the at least one flexible hinge element, and the clip assembly further comprise plastic.

An alternate embodiment of flash-memory card carrier further includes a chassis having a uniformly deep chassis bay portion. At least one flexible hinge element has one end affixed to the chassis at one end of the chassis bay portion and a second end of the at least one flexible hinge element is affixed to a non-contact end of a flash-memory card. In this alternate embodiment of flash-memory card carrier the at least one flexible hinge element, clip assembly and attached flash-memory card are sized to be received and reside within the chassis bay portion for transport or storage to prevent inadvertent loss of the flash-memory card, and wherein the flash-memory card may be deployed from the chassis bay portion on the at least one flexible hinge element to be used while connected to the carrier.

This alternate embodiment of flash-memory card carrier further provides a rectangular, uniformly deep chassis bay portion on an upper corner of a planar rectangular chassis side surface providing a storage of the at least one flexible hinge element and the attached flash-memory card within the bay portion below the planar rectangular chassis side surface.

This alternate embodiment of flash-memory card carrier further includes at least one flash-memory card embedded in the chassis. A plurality of conductive wire leads within the at least one flexible hinge element electronically links the flash-memory card on the flexible hinge element to the at least one flash-memory card embedded in the chassis. The at least one flexible hinge element is operable and deformable to allow the second end of the at least one flexible hinge element and corresponding attached flash-memory card to reach a position orthogonal to the planar rectangular chassis side surface.

For this alternate embodiment of flash-memory card carrier the chassis and the at least one flexible hinge element further comprise plastic.

An alternate embodiment of flash-memory card carrier includes a chassis and a rectangular, uniformly deep chassis bay portion having a chassis backing and sized to receive and releasably hold a flash-memory card. The chassis bay portion is centered on a planar rectangular chassis side surface. A flexible cover element with one end affixed to one end of the planar rectangular chassis surface extends over the chassis bay portion to the other end of the planar rectangular chassis surface. The chassis bay portion includes a vertical adhesive strip on the chassis backing within the chassis bay to releasably hold the flash-memory card. The flash-memory card is sized to be received and reside within the chassis bay portion for transport or storage to prevent inadvertent loss of the flash-memory card. The flash-memory card may be deployed from the chassis bay portion for use by lifting the flexible cover element and detaching the flash-memory card from the vertical adhesive strip within the chassis bay.

BRIEF DESCRIPTION OF DRAWINGS

The above stated features, aspects, and advantages of the flash-memory card carrier will become better understood with regard to the following description and accompanying drawings as further described.

FIG. 1A is a planar elevation view of a prior-art SD flash-memory card 36 that has a series of metal contacts 14 exposed along one edge.

FIG. 1B is a planar elevation view of a prior-art memory stick duo/pro duo flash-memory card 38.

FIG. 1C is a planar elevation view of a prior-art memory stick micro flash-memory card 32 that has a series of metal contacts 16 exposed along one edge.

FIG. 1D is a planar elevation view of a prior-art micro SD flash-memory card 36.

FIG. 2 is a perspective view of prior art wherein a user loses a micro SD flash-memory card 36 while handling the micro SD flash-memory card 36.

FIG. 3 is a perspective view of an embodiment of flash-memory card carrier providing a chassis 140 housing a SD flash-memory card 36 under a flexible cover 144.

FIG. 4 is a perspective view of an embodiment of flash-memory card carrier providing a chassis 140 housing a SD flash-memory card 36 of FIG. 3 with the flexible cover 144 opened for access to the SD flash-memory card 36.

FIG. 5 is an exploded perspective view of the embodiment of flash-memory card carrier providing a chassis 140 housing a SD flash-memory card 36 of FIG. 3 with the flexible cover 144 opened for access to the SD flash-memory card 36, and the SD flash-memory card 36 removed from the uniformly deep chassis bay portion 142 having a chassis backing with vertical adhesive strip 146 within the chassis bay portion 142 for use in a device.

FIG. 6 is a detailed sectional view of FIG. 3 taken at "6-6."

FIG. 7 is a perspective view of an embodiment of flash-memory card carrier providing a chassis 140 housing a micro SD flash-memory card 34 under a flexible cover 144.

FIG. 8 is a perspective view of an embodiment of flash-memory card carrier providing a chassis 110 housing a SD flash-memory card 36 contained within the chassis on flexible hinge element 114.

FIG. 9 is a perspective view of the embodiment of flash-memory card carrier 110 of FIG. 8 depicting flexible hinge element 114 and clip assembly 116 positioned orthogonal to the planar rectangular chassis side surface and the SD flash-memory card 36 detached there from for use in a device.

FIG. 10 is a detailed sectional view of FIG. 8 taken at "10-10."

FIG. 11 is an enlarged detailed view of FIG. 10 taken at "11-11."

FIG. 12 is a perspective view of an embodiment of flash-memory card carrier providing a chassis 120 housing a stick duo/pro duo flash-memory card 38 contained within the chassis and electrically connected to at least one flash-memory card embedded in the chassis 120 via a plurality of wire leads 130 between the stick duo/pro duo flash-memory card 38 and the chassis 120.

FIG. 13 is a perspective view of the embodiment of flash-memory card carrier providing a chassis 120 housing a stick duo/pro duo flash-memory card 38 contained within the chassis and electrically connected to at least one flash-memory card embedded in the chassis 120 via a plurality of wire leads 130 of FIG. 12, depicting flexible hinge element 124 and attached stick duo/pro duo flash-memory card 38 extended from chassis bay element 112 for use in a device.

BEST MODE FOR CARRYING OUT THE INVENTION

Referring more specifically to the drawings, for illustrative purposes the flash-memory card carrier is embodied generally in FIGS. 3-13. It will be appreciated that the flash-memory card carrier may vary as to configuration and as to the details of the parts, and that the method of using the flash-memory card carrier may vary as to details and to the order of steps, without departing from the basic concepts as disclosed herein. The flash-memory card carrier, and a system and method of use thereof, are disclosed generally. However, the disclosed flash-memory card carrier, plus the system and method for using the flash-memory card carrier, may be used in a variety of applications, as will be readily apparent to those skilled in the art.

An embodiment of flash-memory card carrier includes a chassis 110 having a uniformly deep chassis bay portion 112, FIGS. 8-10. At least one flexible hinge element 114 having one end affixed to the chassis 110 at one end of the chassis bay portion 112 is provided. A clip assembly 116 on a second end of the at least one flexible hinge element 114 is sized to receive and releasably hold a non-contact end of a flash-memory card 36. The at least one flexible hinge element 114, clip assembly 116 and releasably attached flash-memory card 36 are sized to be received and reside within the chassis bay portion 112 for transport or storage to prevent inadvertent loss or corruption of the flash-memory card 36. The flash-memory card 36 may be deployed from the chassis bay portion 112 on the at least one flexible hinge element 114 to be detached for use or used while connected to the flash-memory card carrier chassis 110. The at least one flexible hinge element 114 is operable and deformable to allow the second end of the at least one flexible hinge element 114 and corresponding clip assembly 116 and attached flash-memory card 36 to reach a position orthogonal to the planar rectangular chassis side surface. An embodiment of flash-memory card carrier of includes a rectangular, uniformly deep chassis bay portion centered on a planar rectangular chassis side surface providing a storage of the at least one flexible hinge element, the clip assembly and the releasably attached flash-memory card within the bay portion below the planar rectangular chassis side surface, FIGS. 8-9. The uniformly deep chassis bay portion 112 housing the flexible hinge element 114, the clip assembly 116, and the releasably attached flash-memory card 36 may have a backing, FIGS. 12-13, or be open to both sides of the chassis, FIG. 9. The backing for the uniformly deep chassis bay portion 112 may be solid plastic, translucent plastic, or clear plastic, depending on the need for viewing the presence of a flash-memory card within the chassis bay portion 112.

An embodiment of flash-memory card carrier provides an assembly wherein the chassis 110, the at least one flexible hinge element 114, and the clip assembly 116 further comprise plastic.

An alternate embodiment of flash-memory card carrier further includes a chassis 120 having a uniformly deep chassis bay portion 112 having a chassis backing, FIGS. 12-13. At least one flexible hinge element 124 has one end affixed to the chassis 120 at one end of the chassis bay portion 112 and a second end of the at least one flexible hinge element 124 is affixed to a non-contact end of a flash-memory card 38. In this alternate embodiment of flash-memory card carrier the at least one flexible hinge element 124 and attached flash-memory card 38 are sized to be received and reside within the chassis bay portion 112 for transport or storage to prevent inadvertent loss of the flash-memory card, and wherein the flash-memory card 38 may be deployed from the chassis bay portion 112 on the at least one flexible hinge element 124 to be used while connected to the flash-memory card carrier chassis 120.

This alternate embodiment of flash-memory card carrier further provides a rectangular, uniformly deep chassis bay portion 112 on an upper corner of a planar rectangular chassis 120 side surface providing a storage of the at least one flexible hinge element 124 and the attached flash-memory card 38 within the bay portion 112 below the planar rectangular chassis 120 side surface.

This alternate embodiment of flash-memory card carrier further includes at least one flash-memory card embedded in the chassis 120. A plurality of a thin band of conductive wire leads 130 within the at least one flexible hinge element 124 electronically links the flash-memory card 38 connected to the flexible hinge element 124 to the at least one flash-memory card embedded inside the chassis 120. The at least one flexible hinge element 124 is operable and deformable to allow the second end of the at least one flexible hinge element 124 and corresponding attached flash-memory card 38 to reach a position orthogonal to the planar rectangular chassis side surface.

For this alternate embodiment of flash-memory card carrier the chassis 120 and the at least one flexible hinge element 124 further comprise plastic.

An alternate embodiment of flash-memory card carrier includes a chassis 140 and a rectangular, uniformly deep chassis bay portion 142 having a chassis backing and sized to receive and releasably hold a flash-memory card 36, FIGS. 3-5, and 6. The chassis bay portion 142 is centered on a planar rectangular chassis 140 side surface. A flexible cover element 144 with one end affixed to one end of the planar rectangular chassis 140 surface extends over the chassis bay portion 142 to the other end of the planar rectangular chassis 140 surface. The chassis bay portion 142 includes a vertical adhesive strip 146 on the chassis 140 backing within the chassis bay portion 142 to releasably hold the flash-memory card 36. The flash-memory card 36 is sized to be received and reside within the chassis bay portion 142 for transport or storage to prevent inadvertent loss of the flash-memory card. The flash-memory card 36 may be deployed from the chassis bay portion 142 for use by lifting the flexible cover element 144 and detaching the flash-memory card 36 from the vertical adhesive strip 146 within the chassis bay portion 142.

The backing for the uniformly deep chassis bay portion 142 may be solid plastic, translucent plastic, or clear plastic, depending on the need for viewing the presence of a flash-memory card within the chassis bay portion 142.

The disclosed and described embodiments of flash-memory card carrier chassis 110, 120, and 140 and respective uniformly deep chassis bay portions 112, 122, and 142 are adaptable for any sized flash-memory cards as representatively depicted in FIGS. 1-13. These SD card capacities may range from 2 gigabytes ("GB") to 128 GB, or larger, as known in the art.

Accordingly, the disclosed and described embodiments of flash-memory card carriers solve many or all of the above-described problems by providing an improved enclosed carrier for flash-memory card transfer and storage. The enclosure chassis stores at least one flash-memory card, and includes at least one mounting surface having a flexible hinge element affixed to the carrier mounting surface and releasably attached to an end of a flash-memory card to provide use of the flash-memory card while attached to the carrier.

The described and disclosed flexible hinge element affixed to the carrier mounting surface damped enclosure chassis overcomes problems caused by having to manually handle flash-memory cards outside or detached from the carrier and lost, damaged or erased flash-memory cards caused by such limitations in the art.

The described and disclosed embodiments of flash-memory card carriers provide a lightweight and durable flash-memory card carrier capable of preventing flash data card loss, damage or unintentional erasure from point of data loading from a first separate device to the flash-memory card to point of transfer of the data from the flash-memory card to a second separate device.

The described and disclosed embodiments of flash-memory card carriers provide an efficient and inexpensive design, from the stand point of both the cost of the materials and the quantity of materials used in manufacture of the flash-memory card carrier.

The described and disclosed embodiments of flash-memory card carriers are also easy to manufacture. Additionally, the described and disclosed embodiments of flash-memory card carriers are readily assembled such that data degradation or erasures are minimized during set-up and use of the flash-memory card carrier.

The described and disclosed embodiments of flash-memory card carriers provide a convenient and stable system and assembly for uniform data protection and stability for the data contained in at least one flash-memory card from a point of data entry into the at least one flash-memory card to a point of data transfer from the at least one flash-memory card.

Therefore, the foregoing is considered as illustrative only of the principles of the flash-memory card carrier apparatus, system and method for transport, storage and use of flash-memory cards so as to preserve the integrity of data contained therein, and prevent loss, degradation, or damage thereto. Additionally, since numerous modifications and changes will readily occur to those skilled in the art, it is not desired to limit the apparatus, system and method for a flash-memory card carrier apparatus, system and method to the exact construction and operation shown and described, and further, all suitable modifications and equivalents may be resorted to, falling within the scope of the disclosed apparatus, system and method.

I claim:

1. A flash-memory card carrier comprising: a chassis; a uniformly deep chassis bay portion; at least one flexible hinge element comprising one end affixed to the chassis at one end of the chassis bay portion; a clip assembly on a second end of the at least one flexible hinge element, the clip assembly sized to receive and releasably hold a non-contact end of a flash memory card; wherein the at least one flexible hinge element, clip assembly and releasably attached flash memory card are sized to be received and reside within the chassis bay portion for transport or storage to prevent inadvertent loss of the flash memory card, and wherein the flash memory card may be deployed from the chassis bay portion on the at least one flexible hinge element to be detached for use or used while connected to the carrier.

2. The flash-memory card carrier of claim 1 further comprising: a rectangular, uniformly deep chassis bay portion centered on a planar rectangular chassis side surface providing a storage of the at least one flexible hinge element, the clip assembly and the releasably attached flash memory card within the bay portion below the planar rectangular chassis side surface.

3. The flash-memory card carrier of claim 2 wherein the chassis, the at least one flexible hinge element, and the clip assembly further comprise plastic.

4. The flash-memory card carrier of claim 3 wherein the at least one flexible hinge element is operable and deformable to allow the second end of the at least one flexible hinge element and corresponding clip assembly and flash-memory card to reach a position orthogonal to the planar rectangular chassis side surface.

5. The flash-memory card carrier of claim 1 wherein the chassis bay portion comprises a solid chassis backing.

6. The flash-memory card carrier of claim 5 wherein the chassis bay portion comprises a translucent chassis backing.

7. A flash-memory card carrier comprising: a chassis; a uniformly deep chassis bay portion; at least one flexible hinge element comprising one end affixed to the chassis at one end of the chassis bay portion; a second end of the at least one flexible hinge element affixed to a non-contact end of a flash memory card; wherein the at least one flexible hinge element and attached flash memory card are sized to be received and reside within the chassis bay portion for transport or storage to prevent inadvertent loss of the flash memory card, and wherein the flash memory card may be deployed from the chassis bay portion on the at least one flexible hinge element for use or used while connected to the carrier.

8. The flash-memory card carrier of claim 7 further comprising: a rectangular, uniformly deep chassis bay portion on an upper corner of a planar rectangular chassis side surface providing a storage of the at least one flexible hinge element and the attached flash memory card within the bay portion below the planar rectangular chassis side surface.

9. The flash-memory card carrier of claim 8 further comprising at least one flash memory card embedded inside the chassis.

10. The flash-memory card carrier of claim 9 further comprising a plurality of conductive wire leads within the at least one flexible hinge element electronically linking the flash memory card on the hinge element to the at least one flash memory card embedded inside the chassis.

11. The flash-memory card carrier of claim 10 wherein the chassis and the at least one flexible hinge element further comprise plastic.

12. The flash-memory card carrier of claim 11 wherein the at least one flexible hinge element is operable and deformable to allow the second end of the at least one flexible hinge element and corresponding flash-memory card to reach a position orthogonal to the planar rectangular chassis side surface.

13. A flash-memory card carrier comprising: a chassis; a rectangular, uniformly deep chassis bay portion sized to receive and releasably hold a non-contact end of a flash memory card, the chassis bay portion centered on a planar rectangular chassis side surface; a flexible cover element comprising one end affixed to one end of the planar rectangular chassis surface and extending over the chassis bay portion to the other end of the planar rectangular chassis surface; and attachment means within the chassis bay to releasably hold the flash memory card; wherein the flash memory card is sized to be received and reside within the chassis bay portion for transport or storage to prevent inadvertent loss of the flash memory card, and wherein the flash memory card may be deployed from the chassis bay portion for use by lifting the flexible cover element and detaching the flash memory card from the attachment means within the chassis bay.

14. The flash-memory card carrier of claim 13 wherein the attachment means within the chassis bay comprises a vertical adhesive strip running the entire height of the chassis bay.

15. The flash-memory card carrier of claim 13 wherein the chassis bay portion comprises a solid chassis backing.

16. The flash-memory card carrier of claim 13 wherein the chassis bay portion comprises a translucent chassis backing.

* * * * *